(12) United States Patent
Berenger et al.

(10) Patent No.: US 8,013,488 B2
(45) Date of Patent: Sep. 6, 2011

(54) INTEGRATION OF A STARTER/GENERATOR MODULE IN A GAS TURBINE TRANSMISSION HOUSING

(75) Inventors: Serge Berenger, Chevilly Larue (FR); Paul Jean-baptiste Kremer, La Celle Saint Cloud (FR); Samuel Raymond Germain Becquerelle, Montigny le Bretonneux (FR); Alain Vassaux, Puteaux (FR); Denis Jean Noel Vercherin, Boussy Saint Antoine (FR)

(73) Assignee: Hispano-Suiza, Colombes (FR)

( * ) Notice: Subject to any disclaimer, the term of this patent is extended or adjusted under 35 U.S.C. 154(b) by 323 days.

(21) Appl. No.: 12/280,743

(22) PCT Filed: Dec. 4, 2006

(86) PCT No.: PCT/FR2006/051278
§ 371 (c)(1),
(2), (4) Date: Oct. 21, 2008

(87) PCT Pub. No.: WO2007/096493
PCT Pub. Date: Aug. 30, 2007

(65) Prior Publication Data
US 2009/0309461 A1  Dec. 17, 2009

(30) Foreign Application Priority Data

Feb. 27, 2006 (FR) .................................... 06 50673
Sep. 19, 2006 (FR) .................................... 06 53817

(51) Int. Cl.
*H02K 47/00* (2006.01)
*H02K 16/00* (2006.01)
*H02K 23/60* (2006.01)

(52) U.S. Cl. ........ 310/113; 310/112; 310/114; 310/118; 310/120

(58) Field of Classification Search .................... 290/22, 290/31, 44, 52; 310/118, 120, 67 R, 68, 310/112–114
See application file for complete search history.

(56) References Cited

U.S. PATENT DOCUMENTS

| | | | | |
|---|---|---|---|---|
| 2,619,795 | A * | 12/1952 | Drake | 60/225 |
| 5,418,446 | A * | 5/1995 | Hallidy | 322/28 |
| 5,513,719 | A * | 5/1996 | Moroto et al. | 180/65.21 |
| 5,555,722 | A | 9/1996 | Mehr-Ayin et al. | |
| 6,323,625 | B1 | 11/2001 | Bhargava | |
| 6,838,778 | B1 | 1/2005 | Kandil et al. | |
| 2002/0094898 | A1 * | 7/2002 | Hata et al. | 475/5 |
| 2004/0080300 | A1 | 4/2004 | Xu et al. | |
| 2004/0106486 | A1 | 6/2004 | Jonsson | |
| 2004/0144832 | A1 * | 7/2004 | Nakamura et al. | 228/112.1 |
| 2004/0255590 | A1 * | 12/2004 | Rago et al. | 60/772 |

FOREIGN PATENT DOCUMENTS

WO 02 099263 12/2002

\* cited by examiner

*Primary Examiner* — Quyen Leung
*Assistant Examiner* — Jose A Gonzalez Quinones
(74) *Attorney, Agent, or Firm* — Oblon, Spivak, McClelland, Maier & Neustadt, L.L.P.

(57) ABSTRACT

A starter/generator mechanically coupled to a gas turbine transmission housing is disclosed. The starter/generator includes a generator with a rotor forming a field winding and a stator forming an armature, and an energizer with a stator forming a field winding and a rotor forming an armature connected to the generator field winding. The generator rotor and the energizer rotor are mounted on a common shaft with a transmission housing gear wheel, on either side of the gear wheel.

23 Claims, 7 Drawing Sheets

INTEGRATION OF A STARTER/GENERATOR MODULE IN A GAS TURBINE TRANSMISSION HOUSING

BACKGROUND TO THE INVENTION

This invention relates to gas turbines and more particularly to the mounting of a starter/generator (or S/G for "Starter/Generator") on a transmission housing or an accessory gear box. The field of application of the invention is that of gas turbines for aeronautical engines, of aeroplanes or of helicopters, as well as for auxiliary power units (or APU, for "Auxiliary Power Unit").

In a gas turbine, a certain number of items of equipment or accessories are driven by a mechanical transmission from mechanical power taken from a turbine shaft. This mechanical transmission, which comprises a set of gear wheels housed in a casing, is called a transmission housing or an accessory gear box. The accessories particularly comprise various different pumps for the production of hydraulic power, the supply of fuel, lubrication and one or more electric S/Gs.

When the gas turbine is in operation, the or each S/G operates as an electric generator and produces voltage which supplies one or more electrical energy distribution centres for the aeroplane or helicopter and its engine or engines.

When the gas turbine is at rest, an S/G can operate as a starter, being supplied by an external energy source in order to start the gas turbine by rotating the turbine shaft to which the transmission housing is connected.

An S/G of a known type comprises a principal synchronous generator with a principal rotor and a principal stator and an energizer having an armature in the rotor and a field winding in the stator. The energizer armature supplies the principal rotor of the synchronous generator through a rectifier bridge with rotating diodes. In electrical energy generation mode, the armature of the synchronous generator produces an AC voltage as a result of the rotational drive of the field winding supplied with a direct current delivered by the energizer bridge of diodes, the frequency of the AC voltage produced being variable in accordance with the speed of rotation. In starting mode, the principal rotor supplied by the energizer and the principal stator supplied with AC voltage from an external source operate like a synchronous motor.

Such a known S/G is a relatively voluminous piece of equipment which is usually fitted in a special casing on one side of the transmission housing and which is mechanically connected to it. In addition to the electrical equipment, the S/G comprises a lubrication system with a lubricant tank and a pump driven by gears. The outcome of this is great bulk and mass, all the more so as several S/Gs can be mounted on one single transmission housing.

OBJECT AND SUMMARY OF THE INVENTION

The aim of the invention is to propose integration of an S/G in a gas turbine transmission housing, with which it is possible to reduce the volume and bulk a great deal, while retaining easy demountability.

This aim is achieved due to an assembly comprising a gas turbine transmission housing and at least one starter/generator or S/G mechanically coupled to the transmission housing, an assembly in which:
the transmission housing comprises a gear train with several gear wheels,
the starter/generator comprises a generator with a rotor forming a field winding and a stator forming an armature and an energizer with a stator forming a field winding and a rotor forming an armature connected to the generator field winding and
the generator rotor and energizer rotor are mounted on a common shaft with a gear wheel engaged in the transmission housing gear train, on either side of this gear wheel.

Such a mounting brings a substantial saving in mass, as one special mechanical connection with the transmission housing can be dispensed with, the said gear wheel forming part of the transmission housing when the assembly is mounted.

Furthermore, in comparison with mounting the S/G on one side of the transmission housing, a major reduction in bulk and improved balance of the masses are obtained with the arrangement of the synchronous generator and the energizer on either side of the gear wheel.

In addition, the transmission housing and the S/G can share the same means of lubrication/cooling.

Advantageously, the energizer armature is connected to the generator field winding with an electrical connection passing through the gear wheel.

Advantageously again, the energizer armature being connected to the synchronous generator field winding with a rotating diode bridge forming a rectifier, the diodes can be supported by the gear wheel.

Provision can also be made for a permanent magnet generator having a rotor mounted on the common shaft.

Preferably, the permanent magnet generator is mounted on the same side of the gear wheel as the energizer, so as to contribute to good mass balance.

In one embodiment, the S/G, with the gear wheel and the shaft, forms a module or S/G module, which can be coupled to the transmission housing or uncoupled from the latter by translational movement.

The uncoupling of the S/G module or its coupling with the transmission housing can be carried out by means of translational movement parallel with or perpendicular to the axis of the common shaft.

The S/G module can be housed in a case which has at least one opening, through which the gear wheel can be coupled to at least one other gear wheel of the transmission housing.

Advantageously, the S/G module is housed in a case which is joined in a sealed manner to a casing of the transmission housing.

The S/G module can be supplied with lubrication/cooling liquid from a system of the transmission housing.

In another embodiment, the transmission housing and the S/G are housed in a common casing.

Advantageously, then, the assembly formed by the shaft with the said gear wheel and the generator rotor and energizer rotor can be uncoupled from the transmission housing by translational movement parallel with the shaft axis.

In each embodiment, at least two S/Gs can be integrated in the transmission housing, each S/G being mounted on a common shaft with a gear wheel of the transmission housing.

The invention also relates to a gas turbine having an assembly formed by a transmission housing and at least one starter/generator, as defined above, as well as an aeronautical engine or an auxiliary power unit equipped with such a gas turbine.

The invention also relates to a starter/generator module or S/G module, which can be integrated in a gas turbine transmission housing, such a module comprising a generator with a rotor forming a field winding and a stator forming an armature, an energizer with a stator forming a field winding and a rotor forming an armature electrically connected to the generator field winding, a gear wheel and a shaft on which the generator rotor and the energizer rotor are mounted in common with the gear wheel, on either side of the gear wheel.

The S/G module can be housed in a case which has at least one opening through which the gear wheel can be coupled to at least one other transmission housing gear wheel.

In accordance with a particularity of the S/G module, the energizer armature is connected to the generator field winding by an electrical connection passing through the gear wheel.

In accordance with another particularity of the S/G module, the energizer armature is connected to the generator field winding by a rotating diode bridge, the diodes being supported by the gear wheel.

The module can also comprise a permanent magnet generator having a rotor mounted on the common shaft. Advantageously then, the permanent magnet generator is arranged on the same side of the gear wheel as the energizer.

BRIEF DESCRIPTION OF THE DRAWINGS

The invention will be understood better on reading the description which is given below, on a guiding but non-limiting basis, with reference to the attached drawings, in which.

DETAILED DESCRIPTION OF THE EMBODIMENTS

Figure 1:
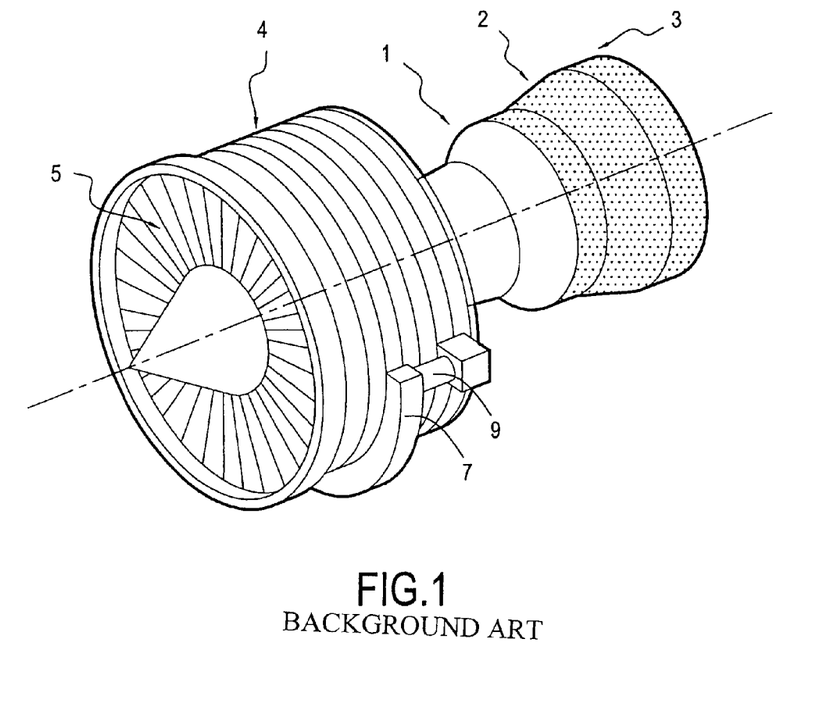
FIG. 1 is a very simplified diagram of a gas turbine engine.

A field of application of the invention is that of aeroplane gas turbine engines, such as the one very schematically shown in FIG. 1, the invention being, however, applicable to other gas turbine aeronautical engines, typically helicopter engines, as well as to gas turbine auxiliary power units.

The engine in FIG. 1 comprises a combustion chamber 1, the combustion gases having left the chamber 1 driving a high-pressure turbine 2 and a low-pressure turbine 3. The turbine 2 is coupled by means of a shaft to a high-pressure compressor 4 supplying the combustion chamber 1 with air under pressure, whereas the turbine 3 is coupled by means of another shaft to a fan 5 at the engine intake.

A transmission housing 7 or accessory gear box is connected by means of a mechanical power take-off 9 to a turbine shaft and comprises a set of gear wheels for driving various different accessories, including at least one (but generally two) starter/generator or S/G.

Figure 2:
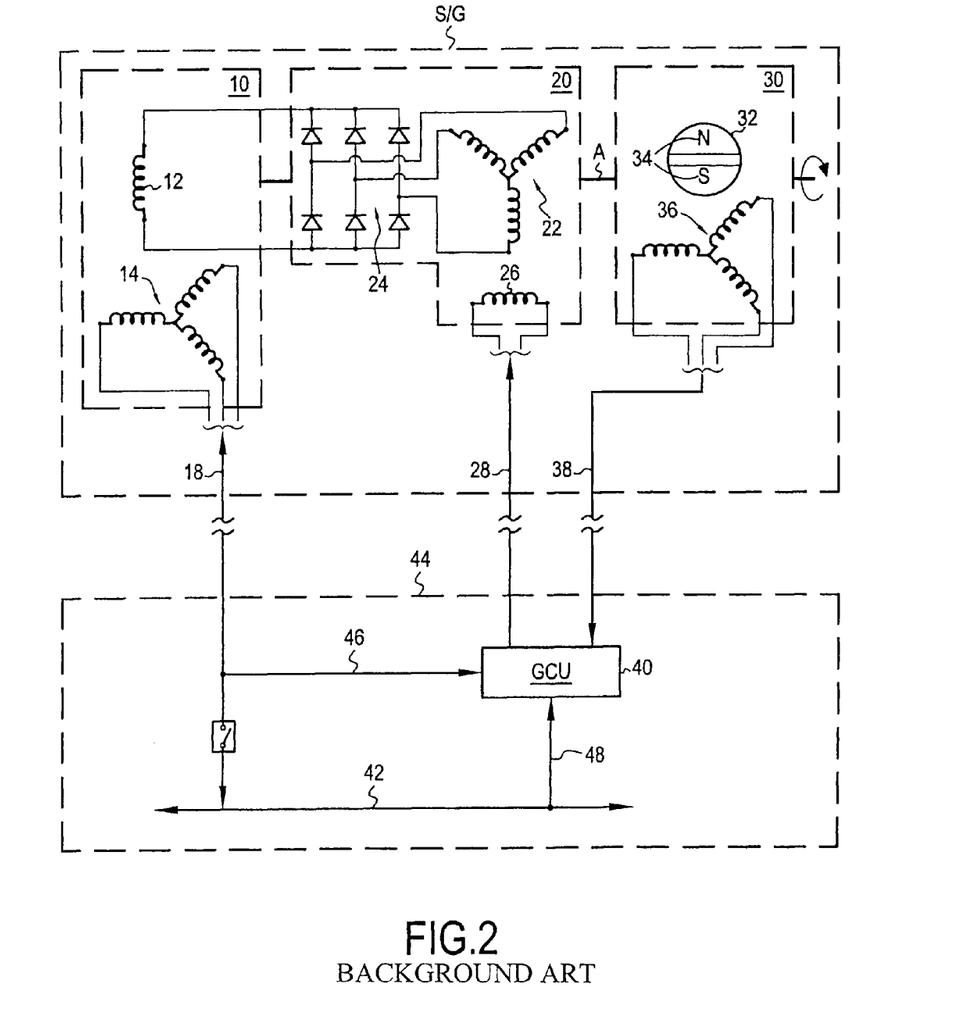
FIG. 2 is a simplified general electrical circuit diagram of a starter/generator.

FIG. 2 shows, in a simplified manner, the general electrical circuit diagram of an S/G comprising a synchronous generator 10, an energizer 20 and a permanent magnet generator 30 or PMG (for "Permanent Magnet Generator"), the rotating parts or rotors of which are coaxial and mounted on one single rotating shaft with axis A.

The synchronous generator 10 forming the principal machine has a principal rotor forming a field winding 12 and a principal stator forming an armature 14. The energizer 20 has a rotor forming an armature 22, to which is connected a rotating diode bridge 24 forming a rectifier and a stator forming a field winding 26. The PMG 30 has a rotor 32 carrying the permanent magnets 34 and a stator forming an armature 36.

In electrical energy generation mode, the field winding 12 of the synchronous generator which is connected to the rectifier 24 receives direct current produced by the energizer and AC voltage is produced by the armature 14 and is transmitted by a harness 18 on an AC bus 42 of an electrical energy distribution circuit such as an aeroplane or helicopter onboard supply system 44. A regulation circuit 40 or GCU (for "Generator Control Unit") is supplied by the PMG 30 via a harness 38. The circuit 40 receives, by means of a line 46, information representative of the value of the output AC voltage produced by the generator 10 and controls the direct current supplied to the field winding 26 of the energizer via a harness 28 in order to regulate the amplitude of the output voltage to a reference value, this voltage having a frequency which is variable according to the speed of rotation of the shaft A.

In starting mode, the regulation circuit 40 is supplied with voltage by means of a line 48 from the AC bus 42 (or from another source), to cause it to operate and to supply the energizer field winding 26 with alternating current. At the same time, the armature 14 is supplied with alternating current by the harness 18 from the AC bus 42 (or from another source), operation then being that of a synchronous motor.

An S/G as described above, as well as its operation and regulation by a GCU, are of a type known per se, the PMG, energizer and synchronous generator forming, in electrical power generation mode, a succession of stages with amplification from one stage to another. It will be noted that the presence of the PMG is not required if the regulation circuit 40 can be supplied from elsewhere. It will also be noted that the functions of the GCU could be integrated in an engine electronic regulation circuit or ECU (for "Engine Control Unit").

Figure 3:
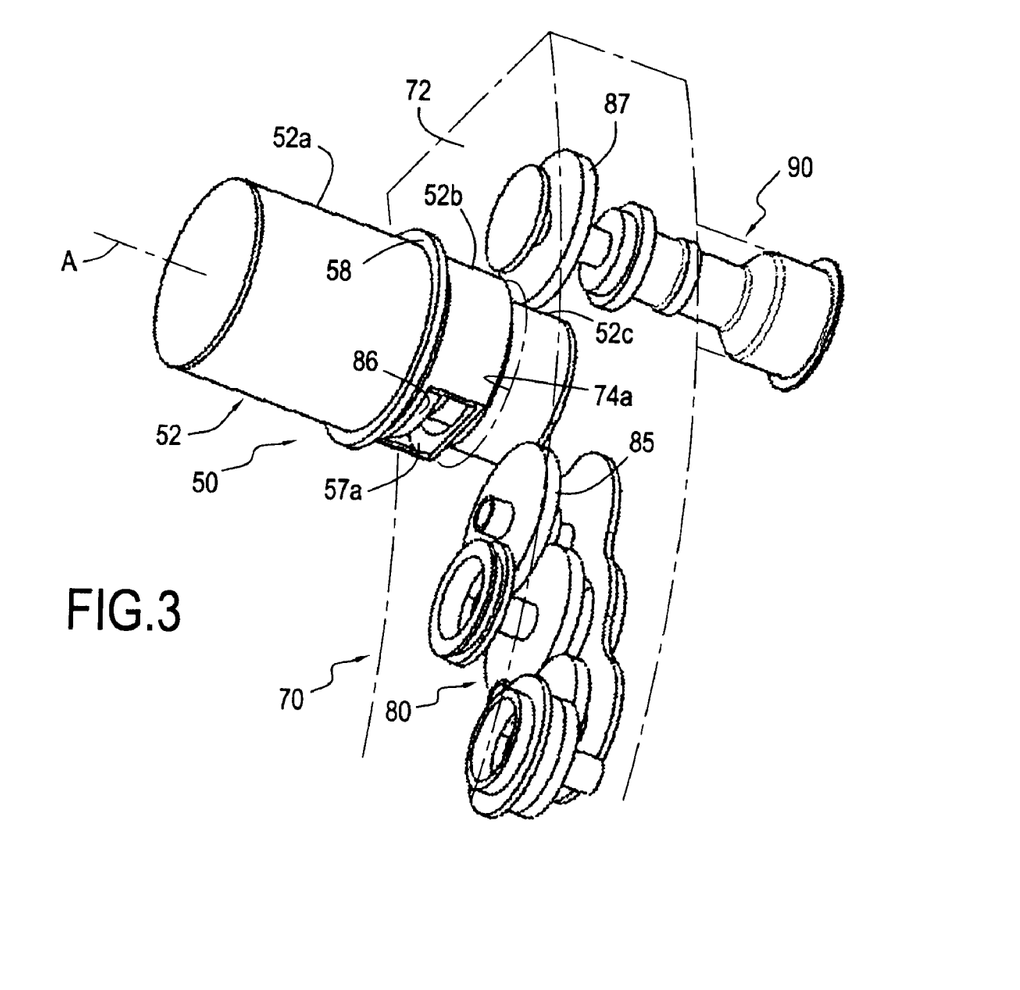
FIG. 3 is a view very schematically showing the integration of an S/G module in a gas turbine transmission housing according to a first embodiment of the invention.
Figure 4:
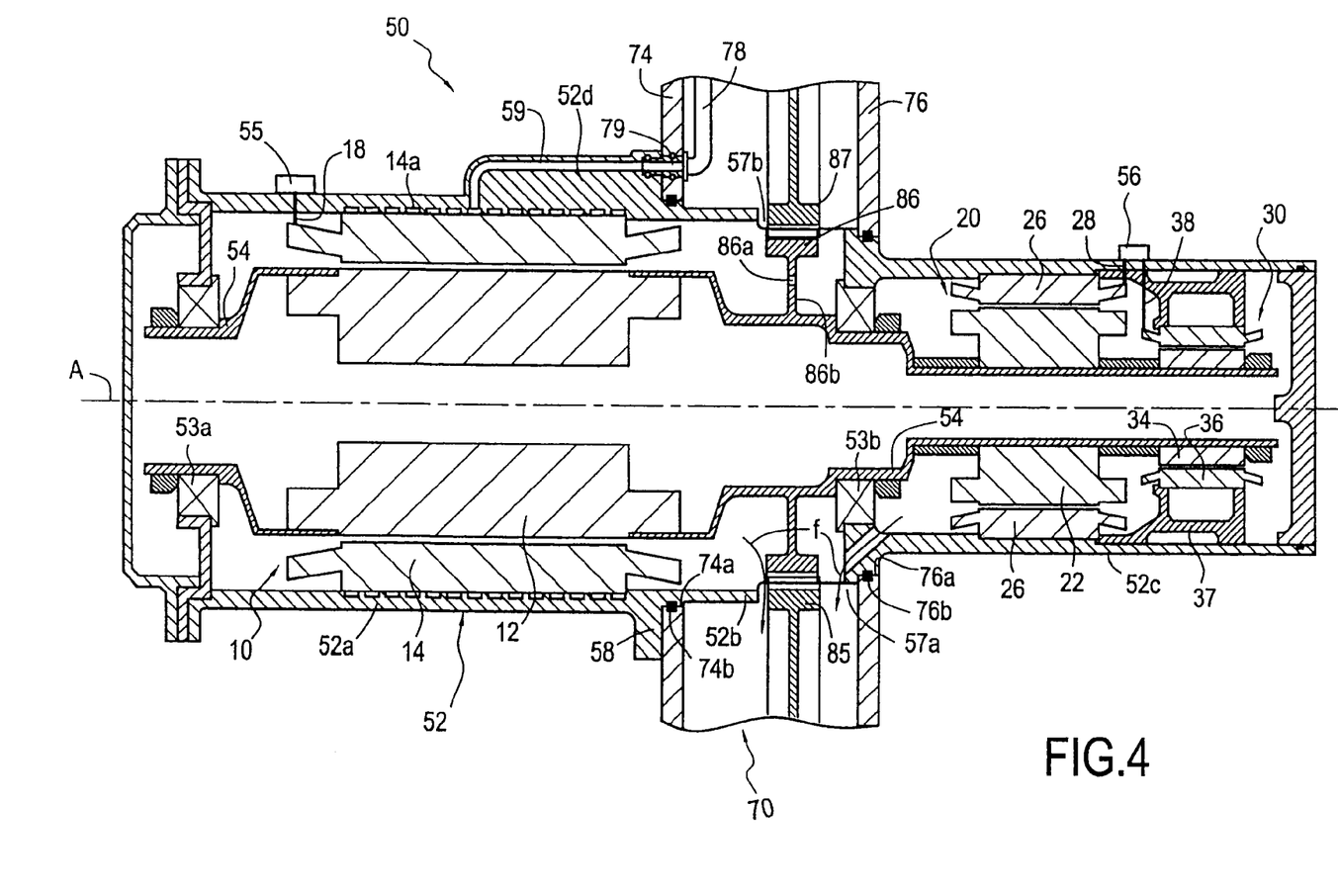
FIG. 4 is a more detailed section view of the S/G module in FIG. 3, FIGS. 5 and 6 are views very schematically showing the integration of an S/G module in a transmission housing according to a variant of the first embodiment of the invention.

FIGS. 3 and 4 illustrate an embodiment of integration, according to the invention, of an S/G module 50 in a gas turbine transmission housing. The transmission housing 70 comprises a casing 72 enclosing a gear train 80 and is mechanically coupled by a power connection 90 to a turbine shaft of a gas turbine, such as a turbine of an aeroplane engine or of a helicopter engine or alternatively of an APU.

The S/G module 50 comprises the actual S/G which is housed in a casing or case 52 with a gear wheel 86 which is inserted between two gear wheels 85 and 87 of the gear train 80 with which it engages.

The rotating parts of the synchronous generator 10, of the energizer 20 and of the PMG 30 forming the S/G are mounted on a shaft 54 in common with the gear wheel 86. The synchronous generator 10 is mounted on one side of the gear wheel 86, whereas the energizer 20 and the PMG 30 are mounted on the other side, to limit the unbalance of masses between the two sides of the gear wheel 86 and, therefore, to limit the overhang of the S/G module 50 from the transmission housing 70.

The shaft 54 is supported in the case 52 by rolling element bearings 53a and 53b. The shaft 54 can be made in a single piece or in several parts axially aligned and rigidly locked together in rotational movement. In the example illustrated, the generator rotor is inserted between two tubular parts of the shaft 54. The gear wheel 86 can be made in a single piece with the shaft 54 or a part thereof or can be made separately and coupled in rotational movement with the shaft 54 by means of a splined connection, for example.

The principal rotor carrying the coils of the generator field winding 12 is thus mounted on the shaft 54, whereas the principal stator carrying the windings of the armature 14 is fastened to the case 52, inside the latter. The harness 18 connected to the armature 14 passes through the case 52 in a sealed manner in order to extend outwards or to be linked up with a connecting unit 55.

Similarly, the rotor of the energizer 20 carrying the windings of the armature 22 is mounted on the shaft 54, whereas the stator of the energizer carrying the coils of the field winding 26 is fastened to the case 52, inside the latter. The rotating diode bridge forming a rectifier is connected, on one hand, to the armature 22 on the side of the gear wheel 86 where this armature is situated and, on the other hand, to the field winding 12 of the synchronous generator on the other side of the gear wheel 86. The connection between the armature 22 and the field winding 12 goes through a passage 86a formed in the gear wheel 86. The diodes of the rotating bridge 24 are advantageously supported by the gear wheel 86, being housed in one or more recesses 86b formed on one face of the gear wheel 86 turned towards the energizer 20 or the generator 10. In this way, effective holding of the diodes is achieved, preventing their damage and that of their connections by the movement of rotation. The supply current of the energizer field winding 26 is supplied by means of a harness 28 which is joined to a connector 56 fastened to the external surface of the case 52, passing through the latter in a sealed manner.

In the example illustrated, the PMG 30 is mounted at the end of the shaft 54, the energizer 20 being situated between the gear wheel 86 and the PMG 30. The magnets 34 of the PMG are fastened to the shaft 54, whereas the windings of the armature 36 of the PMG situated facing the magnets 34 are supported by a part 37 fastened to the case 52, inside the latter. The current produced by the PMG is transported by a harness 38 which, like the harness 28, is joined to the connector 56, passing through the case 52. As indicated above, the PMG could be omitted.

The case 52 is of a cylindrical general shape with the same axis A as the shaft 54 and comprises a part 52a inside which the generator 10 is essentially housed, a part 52c, inside which the energizer 20 and the PMG 30 are housed and an intermediate part 52b joining the parts 52a and 52c and inside which the gear wheel 86 is situated. At its axial ends, the case 52 is closed in a sealed manner by means of covers.

The wall of the intermediate part 52b has openings or apertures 57a and 57b formed in opposite zones of this wall and through which the gear wheel 86 can engage with the gear wheels 85 and 87. When the module 50 is integrated in the transmission housing (FIG. 4), the parts 52a and 52c of the case 52 protrude outwards from the external faces of the opposed side walls 74 and 76 of the casing 72 of the transmission housing 70.

In the example in FIGS. 3 and 4, the module 50 can be extracted from the transmission housing 70, with uncoupling of the gear wheel 86 from the gear wheels 85 and 87 or can be integrated in the transmission housing 70, with coupling of the gear wheel 86 to the gear wheels 85 and 87, by means of a translational movement parallel with the axis A. In FIG. 3, the module 50 is shown partially extracted from the transmission housing 70.

The extraction (uncoupling) of the module 50 and its integration (coupling) are, in this example, carried out on the side of the wall 74 where the part 52a of the case 52 is situated. During the uncoupling or coupling movement, the part 52c of the case 52 passes through coaxial circular openings 74a and 76a formed in the walls 74 and 76 and between the gear wheels 85 and 87, whereas the intermediate part 52b of the case 52 passes through the opening 74a. The respective dimensions of the parts 52b and 52c, of the openings 74a and 76a and of the distance between the gear wheels 85 and 86 are chosen accordingly. The part 52a carries an external flange 58, in the vicinity of its joint with the intermediate part 52b, a flange by means of which the movement of coupling the case is limited by abutment against the wall 74 of the casing 72, this abutment coinciding with the coupling of the gear wheel 86 with the gear wheels 85 and 87.

The case 52 is fastened to the casing 72 by, for example, bolting of the flange 58 on to the wall 74. Other fastening methods can, of course, be adapted such as rapid fastening methods of a known type with elastically deformable locking elements.

Substantially at the joints between the parts 52a and 52b and between the parts 52b and 52c, the external wall of the case is fitted into the openings 74a and 76a with the interposition of the respective seals 74b and 76b. Sealed mounting of the S/G module 50 on the transmission housing 70 is thus carried out, the apertures 57a and 57b existing only on the inside of the casing 72 when the module 50 is integrated in the transmission housing.

A channel 59 for supplying the S/G module 50 with cooling and lubricating liquid is provided for in a boss 52d in the case 52 and opens on the surface of the flange 58 turned towards the wall 74 to be connected to a pipe 78 connected to the cooling and lubricating system of the transmission housing 70. The sealed joint between the channel 59 and the pipe 78 is made by means of a connector 79 through the wall 74. The channel 59 is connected to a system 14a for cooling the armature 14 of the generator 10 and is also connected to nozzles (not shown) providing in particular the lubrication of the bearings 53a and 53b and forming an oil mist inside the case 52. The cooling and lubricating liquid is recovered (arrows f) in the casing 72 through the aperture 57a to be put back in circulation by the transmission housing cooling and lubricating system. As the internal volume of the part 52c of the case 52 is isolated from the rest of the case by the fitting of the bearing 53b substantially at the joint between the parts 52b and 52c, passages are formed in the support of the bearing 53b for the circulation of the liquid to the part 52c of the case and out of the said part.

Although a case 52 has been described which is generally cylindrical with circular openings 74a and 76a, other shapes of the case can be adopted, the shapes of the openings 74a and 76a being chosen accordingly.

Furthermore, although the integration of just one S/G module 50 has been shown, several of such modules, generally two, will be integrated in the transmission housing 70, at different levels of the gear train.

Figure 5:
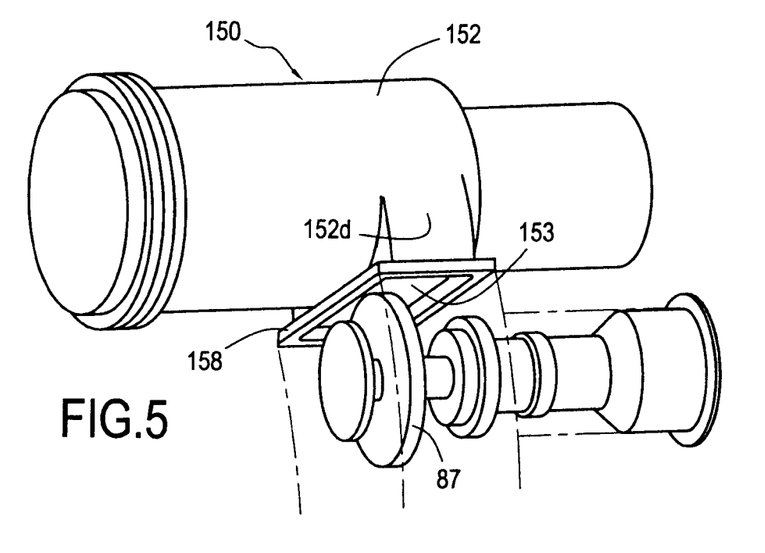
Figure 6:
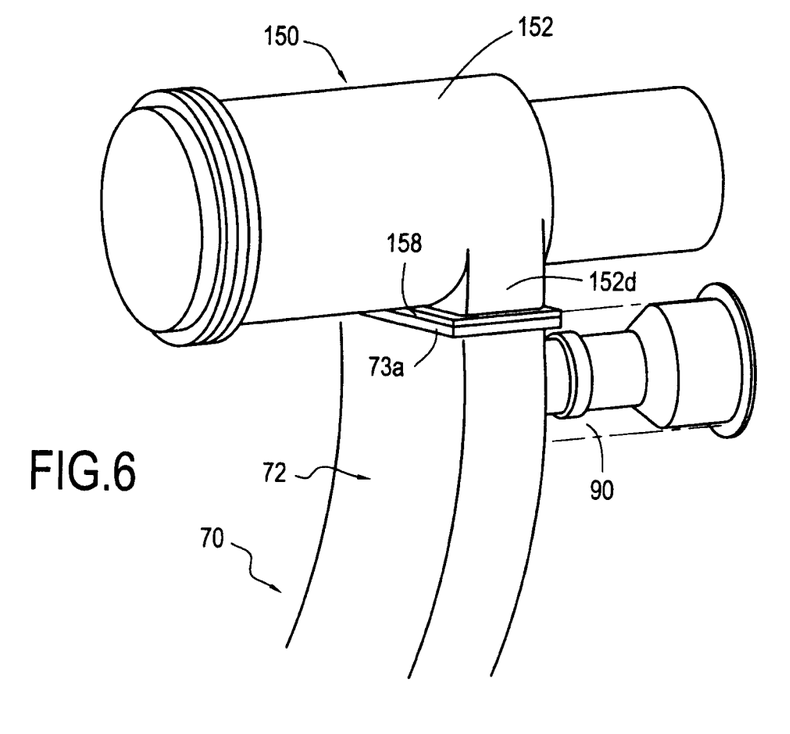
Figure 7:
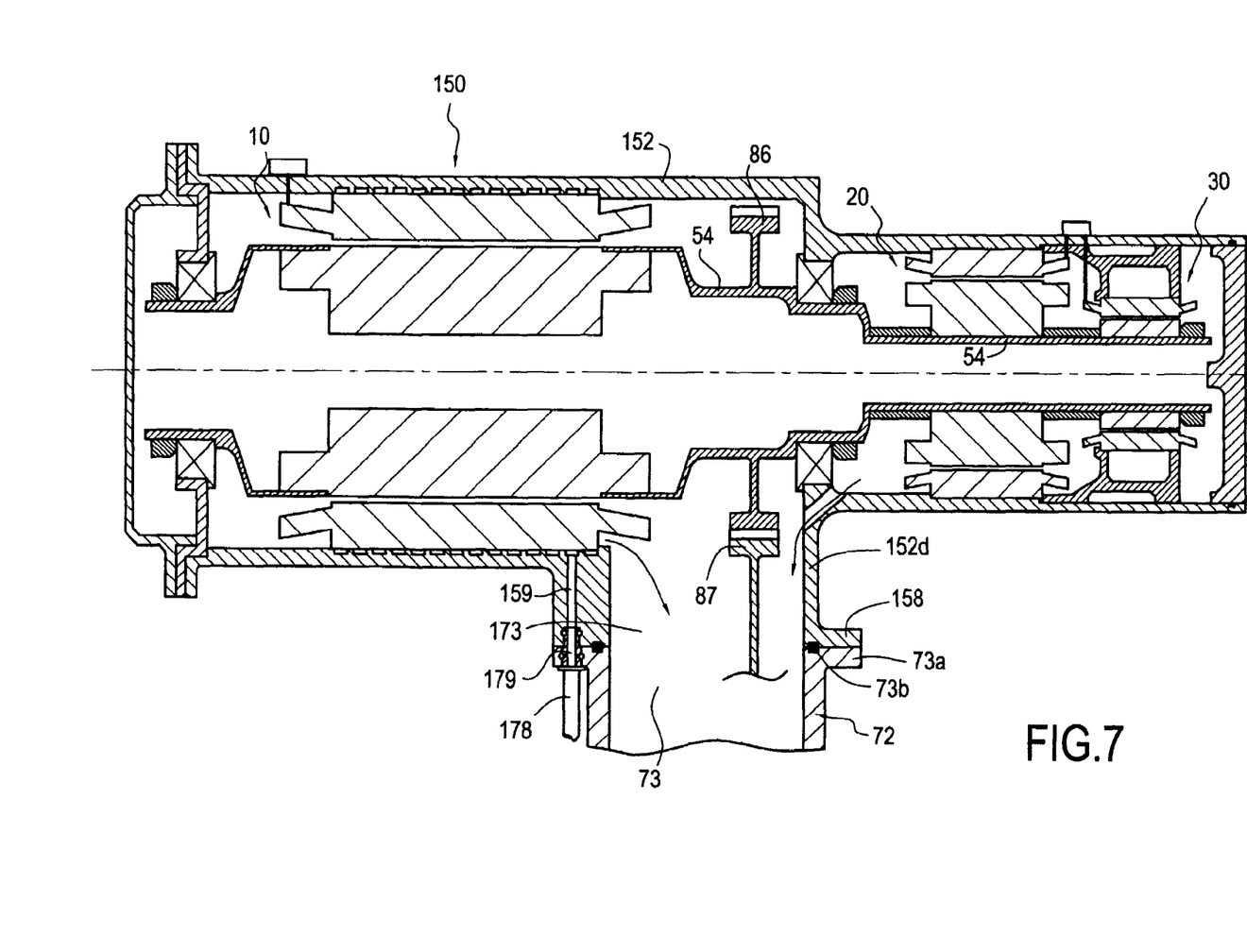
FIG. 7 is a more detailed section view of the S/G module in FIGS. 5 and 6 and FIG. 8 is a view schematically showing the integration of an S/G in a transmission housing according to another embodiment of the invention.

FIGS. 5 to 7 illustrate a variant of carrying out integration, according to the invention, of a S/G module in a gas turbine transmission housing.

This variant is differentiated from that in FIGS. 3 and 4 essentially in that the S/G module 150 is integrated in the transmission housing 70 at one end thereof and can be coupled to the housing or uncoupled from the latter, by means of a translational movement perpendicular to the axis A of the S/G module.

The elements common to FIGS. 3 and 4 on one hand and to FIGS. 5 to 7 on the other hand bear the same references.

The S/G module 150 is differentiated from the S/G module 50 by means of the production of the module case 152, the other elements forming the module 150, principally the generator 10, energizer 20, PMG 30 and the gear wheel 86 mounted on the common shaft 54, being similar to those of the module 50.

The case 152 is of a cylindrical general shape and, in its central part, has a tubular transitional part 152d which is integral with the case 152 and defines an opening 153. The opening 153 is situated in one plane and is surrounded by an external flange 158.

The case 152 is joined to the transmission housing casing 72, at one end of this casing where an opening 73 is formed, of a shape corresponding to the opening 153. The connection between the case 152 and the casing 72 is formed by, for example, bolting the flange 158 on to a similar flange 73a of the casing 72 surrounding the opening 73. With a seal 73b between the flanges 173 and 73, the S/G module 150 can be mounted, sealed, on the transmission housing 70. Other connection means can be used, such as known rapid connection means with locking by elastically deformable elements. Although openings 153 and 73 of rectangular shape have been shown, other shapes can be adopted. Furthermore, the joint surface between the case 152 and the casing 72 can be flat or otherwise.

The integration or coupling of the S/G module 150 in or to the transmission housing 70 and its extraction or uncoupling from the transmission housing are carried out by translational movement perpendicular to the axis A. The gear wheel 86 engages with a gear wheel 87 of the transmission housing gear train through the openings 73 and 153.

A channel 159 for supplying the S/G module 150 with cooling and lubricating liquid is provided for in a boss in the transitional part 152d and opens on the surface of the flange 158 turned towards the flange 73a. The channel 159 is connected to a pipe 178 connected to the cooling and lubricating system of the transmission housing 70. The joint between the channel 159 and the pipe 178 is made by means of a connector 179 through the flanges 158 and 73a.

The circulation of the cooling and lubricating liquid is effected as described above with regard to the S/G module 50, with return into the casing 72 of the transmission housing through the openings 173 and 73.

Although a case 152 of a cylindrical general shape has been considered, other shapes are possible, especially as the restriction of inserting the case in the openings of the casing 72 and between two gear wheels of the transmission housing gear train does not exist.

In addition, a second S/G module 150 can be integrated in the transmission housing at the other end of the latter. It would also be possible to integrate an S/G case 50 and a S/G case 150 in one single transmission housing.

Figure 8:
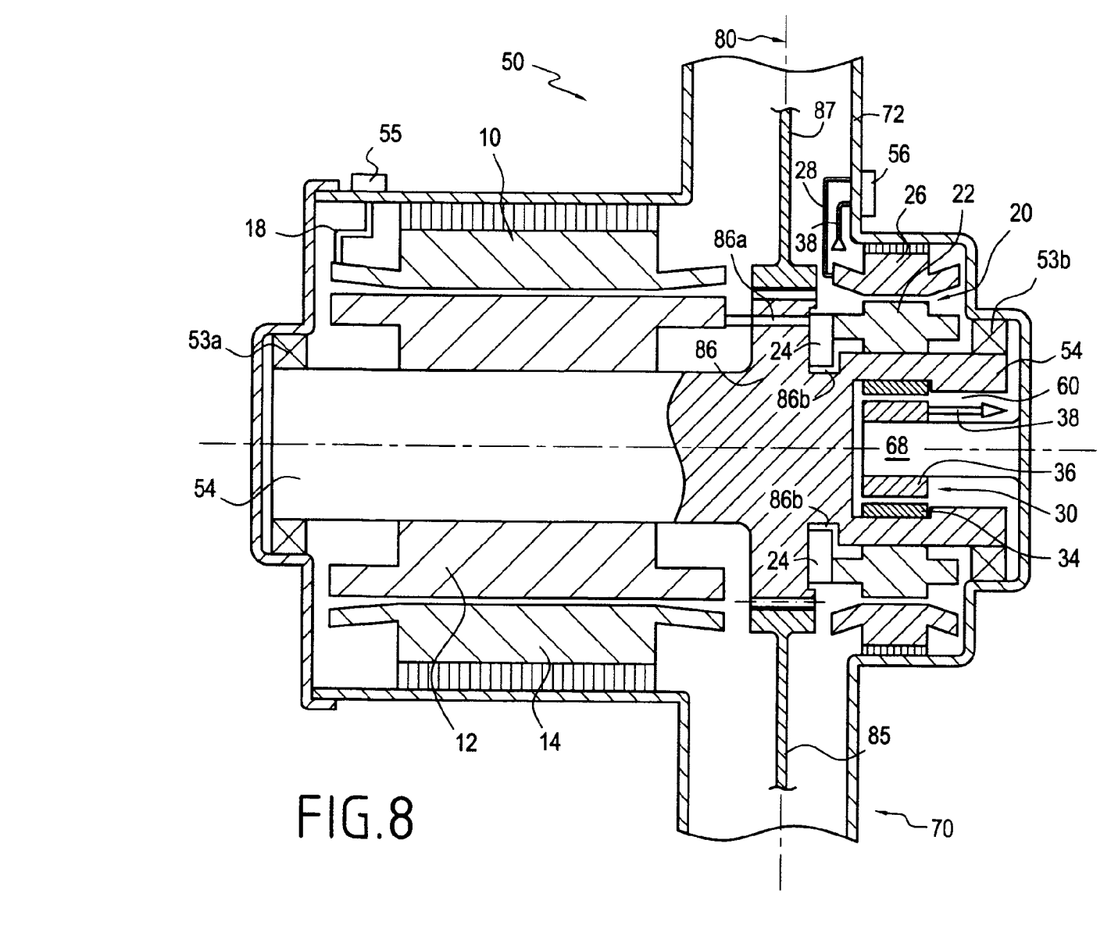

FIG. 8 illustrates another method of carrying out integration, according to the invention, of an S/G in a gas turbine transmission housing. Some same numerical references are allocated to the elements which are common with those of the embodiment in FIG. 4. The transmission housing 70 comprises a casing 72 enclosing a gear train 80 and is mechanically coupled to a turbine shaft of a gas turbine, such as a turbine of an aeroplane engine or of a helicopter engine or alternatively of an APU.

The S/G is integrated with a gear wheel 86 of the transmission housing gear train 80, the gear wheel 86 being inserted between gear wheels 85 and 87. A supplementary S/G can be integrated in the same way with another gear wheel. The rotating parts of the synchronous generator 10, of the energizer 20 and of the PMG 30 are mounted on a shaft 54, common to the gear wheel 86, for example forming a single piece with the latter. The shaft 54 is supported in the casing 72 by rolling element bearings 53a and 53b.

The synchronous generator 10 is mounted on one side of the gear wheel 86, whereas the energizer 20 and the PMG 30 are mounted on the other side.

The principal rotor carrying the coils of the generator field winding 12 is mounted on the shaft 54, whereas the principal stator carrying the windings of the armature 14 is fastened to the casing 72. The harness 18 connected to the armature 14 passes through the casing 72 in a sealed manner to extend outwards or to be linked up to a connecting unit 55.

Similarly, the rotor of the energizer 20 carrying the windings of the armature 22 is mounted on the shaft 54, whereas the stator of the energizer carrying the coils of the field winding 26 is fastened to the casing 72. The rotating diode bridge 24 forming a rectifier is connected, on one hand, to the armature 22 on the side of the gear wheel 54 where this armature is situated and, on the other hand, connected to the field winding 12 of the synchronous generator on the other side of the gear wheel 86 going through a passage 86a formed in the gear wheel. The diodes of the rotating bridge 24 are advantageously supported in housings 86b formed on the face of the gear wheel 86 turned towards the energizer 20, to provide effective holding of the diodes, preventing damage thereto and to their connections by the rotary movement. The supply current of the energizer field winding 26 is brought in by a harness 28 which is linked up to a connector 56 fastened on to the external surface of the casing 72, passing through the latter in a sealed manner.

In the example illustrated, the PMG is housed in an axial recess 60 formed at the end of the shaft 54. The PMG magnets 34 are fastened to the cylindrical internal surface of the recess 60, whereas the windings of the PMG armature 36 situated facing the magnets are supported by an axial rod 68 fastened to the casing 72. With this mounting of the PMG, it is possible to reduce the axial dimension of the S/G and this mounting therefore contributes to the compactness of the assembly, the energizer rotor and stator surrounding the PMG. In a variant it will, of course, be possible to mount the PMG in a manner offset axially relative to the generator with the magnets fastened to the periphery of the shaft 54 and surrounded by the PMG armature fastened to the casing 72. The current produced by the armature 36 is transported by a harness 38 which, like the harness 28, is linked up to the connector 56, passing in a sealed manner through the casing 72.

The assembly formed by the shaft 54 with the gear wheel 86, the rotor of the energizer 20, the rotor of the PMG 30 and the principal rotor of the synchronous generator 10 can be demounted by being extracted from the transmission housing by means of translational movement parallel with the axis of the shaft 54. In the example illustrated, this extraction can be carried out from the side where the synchronous generator 10 is situated. To assist this extraction, it is therefore desirable for the outside diameter of the rotor of the energizer 20 to be smaller than the minimum distance between the teeth of the gear wheels which engage with the gear wheel 86 (or in a substantially equivalent manner, smaller than the diameter of the gear wheel 86 at the gaps between the teeth). Similarly, it is desirable for the diameter of the gear wheel 86 at the tips of the teeth to be smaller than the inside diameter of the stator of the synchronous generator 10.

The integration of the S/G in the transmission housing with a common casing 72 according to the embodiment in FIG. 8 not only brings a reduction in bulk and mass but, with this integration, it is possible also for the S/G to benefit from the transmission housing means of cooling and lubrication, the cooling and lubrication being readily obtained by the creation of oil mist inside the casing by means of one or more nozzles.

The integration, according to the invention, of one or more S/Gs in a gas turbine transmission housing brings with it a reduction in bulk and mass and, with this integration, it is possible to pool resources for cooling and lubrication between the S/G and the transmission housing, while allowing demountability. In the embodiment in FIGS. 3 to 7, as the demountability and the mounting of the S/G module are particularly rapid and easy, the capability is retained, in the case of an aeroplane engine, of removing an S/G module and replacing it by means of rapid work carried out beneath the aeroplane wing.

The invention claimed is:

1. An assembly comprising
a gas turbine transmission housing; and
at least one starter/generator mechanically coupled to the transmission housing, wherein
the transmission housing comprises a gear train with several gear wheels,
the starter/generator comprises a generator with a rotor forming a field winding and a stator forming an armature and an energizer with a stator forming a field winding and a rotor forming an armature connected to the generator field winding, and
the generator rotor, the energizer rotor and a gear wheel engaged in the transmission housing being mounted on a common shaft with the generator rotor being located on a first side of said gear wheel and the energizer rotor being located on a second side of said gear wheel, opposite said first side, and the generator rotor and the energizer rotor being driven in common by said gear wheel.

2. The assembly according to claim 1, wherein the energizer armature is connected to the generator field winding by an electrical connection passing through the said gear wheel.

3. The assembly according to claim 1, wherein the energizer armature is connected to the generator field winding by a rotating diode bridge, the diodes being supported by the said gear wheel.

4. The assembly according to claim 1, further comprising a permanent magnet generator having a rotor carrying permanent magnets and a stator forming an armature, the rotor of the permanent magnet generator being mounted on the said common shaft.

5. The assembly according to claim 4, wherein the permanent magnet generator is arranged on the same side of the said gear wheel as the energizer.

6. The assembly according to claim 1, wherein the starter/generator forms, with the said gear wheel and the shaft, a module which can be coupled to the transmission housing or uncoupled from the latter by translational movement.

7. The assembly according to claim 6, wherein the coupling and uncoupling of the module are carried out parallel with the axis of the common shaft.

8. The assembly according to claim 6, wherein the coupling and uncoupling of the module are carried out perpendicular to the axis of the common shaft.

9. The assembly according to claim 6, wherein the module is housed in a case which has at least one opening, through which the said gear wheel can be coupled to at least one other gear wheel of the housing.

10. The assembly according to claim 6, wherein the module is housed in a case which is joined in a sealed manner to a casing of the transmission housing.

11. The assembly according to claim 6, wherein the module is supplied with lubricating/cooling liquid from a transmission housing system.

12. The assembly according to claim 1, wherein the transmission housing and the starter/generator are housed in a common casing.

13. The assembly according to claim 12, wherein the assembly formed by the shaft with the said gear wheel and the generator rotor and energizer rotor can be uncoupled from the transmission housing by translational movement parallel with the shaft axis.

14. The assembly according to claim 1, comprising at least two starters/generators, each mounted on a common shaft with a transmission housing gear wheel.

15. A gas turbine having a transmission housing mechanically coupled to a shaft of the turbine and at least one starter/generator, in which the transmission housing and the starter/generator form an assembly according to claim 1.

16. A gas turbine aeronautical engine having a turbine according to claim 15.

17. A gas turbine auxiliary power unit having a turbine according to claim 15.

18. A starter/generator module which can be integrated in a transmission housing of a gas turbine, comprising:
a generator with a rotor forming a field winding and a stator forming an armature;
an energizer with a stator forming a field winding and a rotor forming an armature connected to the generator field winding; a gear wheel; and
a shaft on which the generator rotor and the energizer rotor are mounted in common with the gear wheel,
wherein the generator rotor is located on a first side of the gear wheel, the energizer rotor is located on a second side of the gear wheel, opposite the first side, and the generator rotor and the energizer rotor are driven in common by the gear wheel.

19. The module according to claim 18, wherein the module is housed in a case which has at least one opening through which the said gear wheel can be coupled to at least one other transmission housing gear wheel.

20. The module according to claim 18, wherein the energizer armature is connected to the generator field winding by an electrical connection passing through the said gear wheel.

21. The module according to claim 18, wherein the energizer armature is connected to the generator field winding by a rotating diode bridge, the diodes being supported by the said gear wheel.

22. The module according to claim 18, further comprising a permanent magnet generator having a rotor mounted on the common shaft.

23. The module according to claim 22, wherein the permanent magnet generator is situated on the same side of the said gear wheel as the energizer.

* * * * *